April 9, 1963   S. J. BUCHSBAUM   3,085,058
PLASMA HEATING
Filed Dec. 8, 1959

INVENTOR
S. J. BUCHSBAUM
BY
ATTORNEY

3,085,058
PLASMA HEATING

Solomon J. Buchsbaum, Morristown, N.J., assignor to Bell Telephone Laboratories, Incorporated, New York, N.Y., a corporation of New York
Filed Dec. 8, 1959, Ser. No. 858,234
2 Claims. (Cl. 204—154.2)

This invention relates to apparatus for providing a plasma in which the ions are selectively heated.

A plasma of this kind is of use in various equipment, particularly equipment for the study of the physics of ionized gases. Additionally, a plasma of this kind is important in some of the more promising proposals for a controlled thermonuclear fusion reactor.

For example, the principles of the invention have particular application to equipment of the kind typified by the stellarator. The stellarator is apparatus designed for the study of controlled thermonuclear fusion and derives its name from the technique employed for confining a hot plasma. The basic principles of the stellarator are discussed in a paper by L. Spitzer, Jr., entitled, "The Stellarator Concept," pages 253–264, in the Physics of Fluids, volume 1, No. 4, July-August 1958. The stellarator is also the subject of United States Patent 2,910,414, which issued October 27, 1959, to L. Spitzer, Jr. The invention has special application and will be conveniently described with reference to the specific form of stellarator described in a paper by T. H. Stix and R. W. Palladino, entitled, "Experiments on Ion Cyclotron Resonance," pages 446–451, in the Physics of Fluids, volume 1, No. 5, September-October 1958.

The stellarator described in the last-mentioned paper comprises a magnetically confined plasma with provision for heating the ions of the plasma by supplying energy into ion cyclotron waves and causing this wave energy to thermalize. In such an arrangement, it is important that the thermalization process supply energy preferentially to the ions rather than the electrons. However, because of the smaller mass of the electrons there is a strong tendency for the energy supplied to excite the electrons rather than the ions. Various solutions have been proposed to compensate for this tendency, and the paper discloses one proposal involving a particular manner of exciting the ion cyclotron wave.

The present invention relates to an improved solution to this problem of exciting the ions of a plasma selectively in preference to the electrons.

More particularly, the present invention is based on my discovery that by providing initially a mixture of two gases for ionization whereby the resulting plasma contains two ion species of different charge/mass ratio there will result three distinct radial modes of oscillation of the plasma each with a distinctive resonant frequency. Of these one corresponds to transverse oscillations of the two ion clouds 180 degrees out of phase with one another and little motion of the electrons in the plasma. Collisions between the ions of the two species as the ion clouds pass through one another is analogous to the friction between two rubbing bodies and causes the oscillatory motion of the ions to be transformed into random motion. Accordingly, by supplying wave energy of this distinctive frequency to the plasma, such wave energy is quickly transformed with high efficiency into thermal energy of the ions.

The invention will be better understood from the following more detailed description, taken in conjunction with the accompanying drawing, in which.

Figure 1:
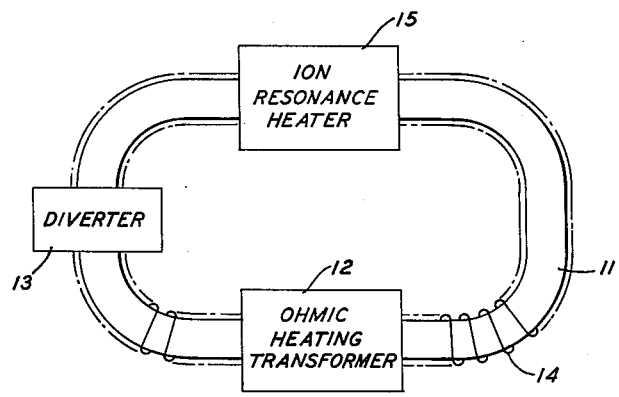
FIG. 1 shows in schematic form the basic elements of a stellarator.

The stellarator shown in FIG. 1 in most respects is as described in the aforementioned Stix et al. paper and, accordingly, reference may be had to such paper for a detailed description of most of the detail.

Basically, the stellarator comprises a toroidal vacuum tube or chamber 11 of circular cross section which houses the gases to be ionized. Surrounding one portion of the chamber is an ohmic heating transformer 12 which is used to ionize the plasma and to provide initial heating of the plasma by increasing the energy of the electrons of the plasma which, in turn, give up some of their energy to ions and thereby provide some heating of the ions. Advantageously, this element substantially completely ionizes the gases in the chamber.

Also surrounding a portion of the chamber 11 is the diverter 13 which leads off to a vacuum pump (not shown). The vacuum pump is used to provide initial exhaustion of the chamber before the gas mixture to be ionized for forming the plasma is introduced. An additional function of the diverter is to eliminate from the plasma any impurities therein which are introduced by the collision of ions and electrons with the chamber walls.

For providing the desired magnetic field used for confining the plasma, a wire is wound around the chamber wall. The same wire is wound in two separate layers to provide both the helical windings and the confining field windings used to achieve the magnetic field configuration characteristic of the stellarator in which a single magnetic line of force, followed indefinitely, generates an entire toroidal surface. However, in the interest of simplicity, the wire has been shown schematically by a few turns 14 along a single isolated portion of the chamber.

Figure 2:
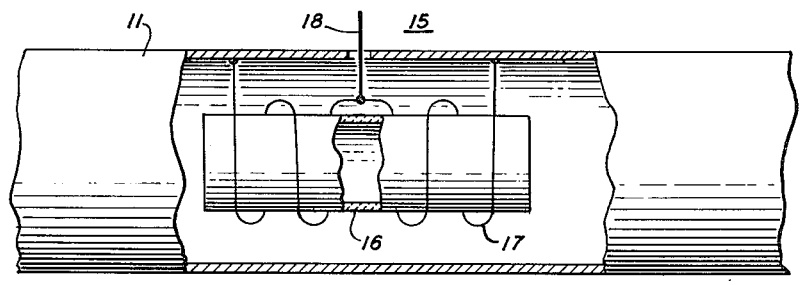
FIG. 2 shows an ion resonance heater in accordance with the invention for use with the stellarator shown in FIG. 1.

Additionally, the stellarator includes an ion resonance heater 15 which is used to apply to the plasma wave energy of the frequency suitable for exciting the desired ion resonance mode. As shown in more detail in FIG. 2, the resonance heater comprises a ceramic tube 16 open at its two ends for passage of the plasma therethrough and is inserted in a region of uniform magnetic field in the vacuum chamber. The energizing coil 17 for supplying wave energy to the plasma is wound over the ceramic tube. In contradistinction to the Stix et al. apparatus, in the present embodiment the energizing coil is arranged to provide within the ceramic tube an electric field which is uniform in phase throughout the length of the tube. Of course this requires that the length of the coil be short relative to the wavelength of the supplied wave energy. As shown, the two ends of the energizing coil are grounded to the chamber wall and a hot radio frequency lead 18 from an external wave energy source is connected to the center tap of the energizing coil. However, the two halves of the coil are wound in opposite senses so that the resulting field is in the same phase along the full length of the tube. Alternatively, the coil may be wound uniformly and fed from one end.

As another significant modification from the Stix et al. arrangement, there is included in the vacuum chamber a mixture of two gases. Typically, the chamber would be provided with an inlet by which the desired mixture of gases would be introduced after the chamber had first been exhausted. For intermittent operation, after the desired amount of gases had been introduced, the inlet would be closed. Alternatively, when continuous operation is desired, the gases at appropriate pressure are supplied continuously. Typically, to provide an advantageous density of ions in the plasma, sufficient gas is introduced to provide a pressure of between .1 and 100 microns of mercury in the chamber. The aforementioned patent to Spitzer discusses in more detail the limitations on the pressure of the gas in the chamber. In the preferred embodiment the two gases comprise deuterium, the hydrogen isotope having one neutron, and tritium, the hydrogen isotope having two neutrons.

It can be shown that when the plasma possesses two or more ion species of different charge/mass ratios, differing no more than by a factor of about thirty, a resonance condition results at a frequency which depends on the relative concentration of the ions but which does not involve the electrons to any appreciable extent. The larger the ratio of the charge/mass ratios of the two ion species the more is electron motion involved in the resonance. In particular, the resonance involves the oscillation of the two ion clouds out of phase with each other with the electrons remaining relatively motionless.

It can be shown that the frequency $\omega$ of this ion mode resonance is given by:

$$\omega = \sqrt{\left(\frac{x_1 y_2 + x_2 y_1}{x_1 y_1 + x_2 y_2}\right) \omega_1 \omega_2}$$

where $x_1$ and $x_2$ are the fractional amounts of the two ion species in the mixture ($x_1 + x_2 = 1$), $y_1$ and $y_2$ are the ratios of the electron mass/charge ratio to the ion mass/charge ratio of the two gases, and $\omega_1$ and $\omega_2$ are the cyclotron frequencies of the two ions and are given by $$\frac{e_1 B}{M_1}$$

and $$\frac{e_2 B}{M_2}$$

where $e_1$ and $e_2$ are the charges of the two ions, B is the magnetic field acting on the ions, and $M_1$ and $M_2$ are the masses of the two ions. This relationship is based on the assumption that the ion density is substantially uniform with radius. When this assumption does not apply, there will be a geometric correction factor which is dependent on the actual radial density distribution.

This resonance is of the "plasma resonance" type in that it is accompanied by a large amplitude of the alternating current space charge. Moreover, the ion velocities of the two ion species are 180 degrees out of phase with each other. Since at resonance only a small amount of collisional damping leads to large absorption of the wave, considerable ion heating can be realized.

It can be seen from the above equation that the resonance frequency is related both to the ratio of the charge/mass ratios of the two ions and to their relative concentrations in the mixture.

It is found that there is an optimum ratio of the concentrations of the two ion species. In particular, to a good approximation the optimum ratio of the concentrations of the two ion species advantageously is equal to the ratio of the masses of the two ion species. When the two gases in the mixture are deuterium and tritium, the optimum mixture accordingly comprises by weight 40 percent deuterium and 60 percent tritium. The appropriate resonance then occurs at a frequency which is about 1.3 times the cyclotron frequency of tritium, the larger mass ion. When the magnetic field has a strength of 20,000 gausses, a typical value, the resonance occurs at about ten megacycles. Operation in this manner forms the preferred embodiment of the invention.

It can be appreciated that the plasma heating principles described can be incorporated into other apparatus. Moreover, other pair combinations of ion species can be employed, for example, the mixture may include ionized atomic hydrogen and singly or doubly ionized helium.

What is claimed is:
1. The method of providing a heated gas plasma comprising the steps of magnetically enclosing a mixture of two gases having different charge/mass ratios differing no more than by a factor of thirty, ionizing the two gases to form a plasma of two separate ion species, and supplying to the mixture for setting into oscillation separately the two ion species radio frequency energy of a frequency substantially equal to

$$\sqrt{\frac{x_1 y_2 + x_2 y_1}{x_1 y_1 + x_2 y_2} \omega_1 \omega_2}$$

where $x_1$ and $x_2$ are the fractional amounts by weight of the two ion species, $y_1$ and $y_2$ are the ratios of the electron mass/charge ratio to the ion mass/charge ratio of the two gases, and $\omega_1$ and $\omega_2$ are the cyclotron frequencies of the two ions, the ratio of the concentrations of the two ion species being substantially equal to the ratio of the masses of the two ion species.

2. The method of providing a heated gas plasma comprising the steps of magnetically confining a mixture which comprises by weight sixty percent tritium and forty percent deuterium, ionizing the mixture for forming a plasma, and supplying to the mixture for heating the plasma electromagnetic wave energy of a frequency which is about 1.3 times the cyclotron frequency of the tritium ion.

References Cited in the file of this patent

UNITED STATES PATENTS 2,969,308   Bell et al. _____ Jan. 24, 1961

FOREIGN PATENTS 1,180,695   France _____ Jan. 5, 1957

OTHER REFERENCES

NYO-7899, U.S. Atomic Energy Commission. The Proposed Model, C. Stellerator Facility, Aug. 29, 1957, pp. 15-32, 362-365.

Project Sherwood by Amasa S. Bishop. Addison-Wesley Pub. Co., Reading, Mass., September 1958, pp. 1-4.

TID-7558, Controlled Thermonuclear Conference held at Washington, D.C., Feb. 3-5, 1958 (issued October 1958), pp. 264-278.